Figure 1:
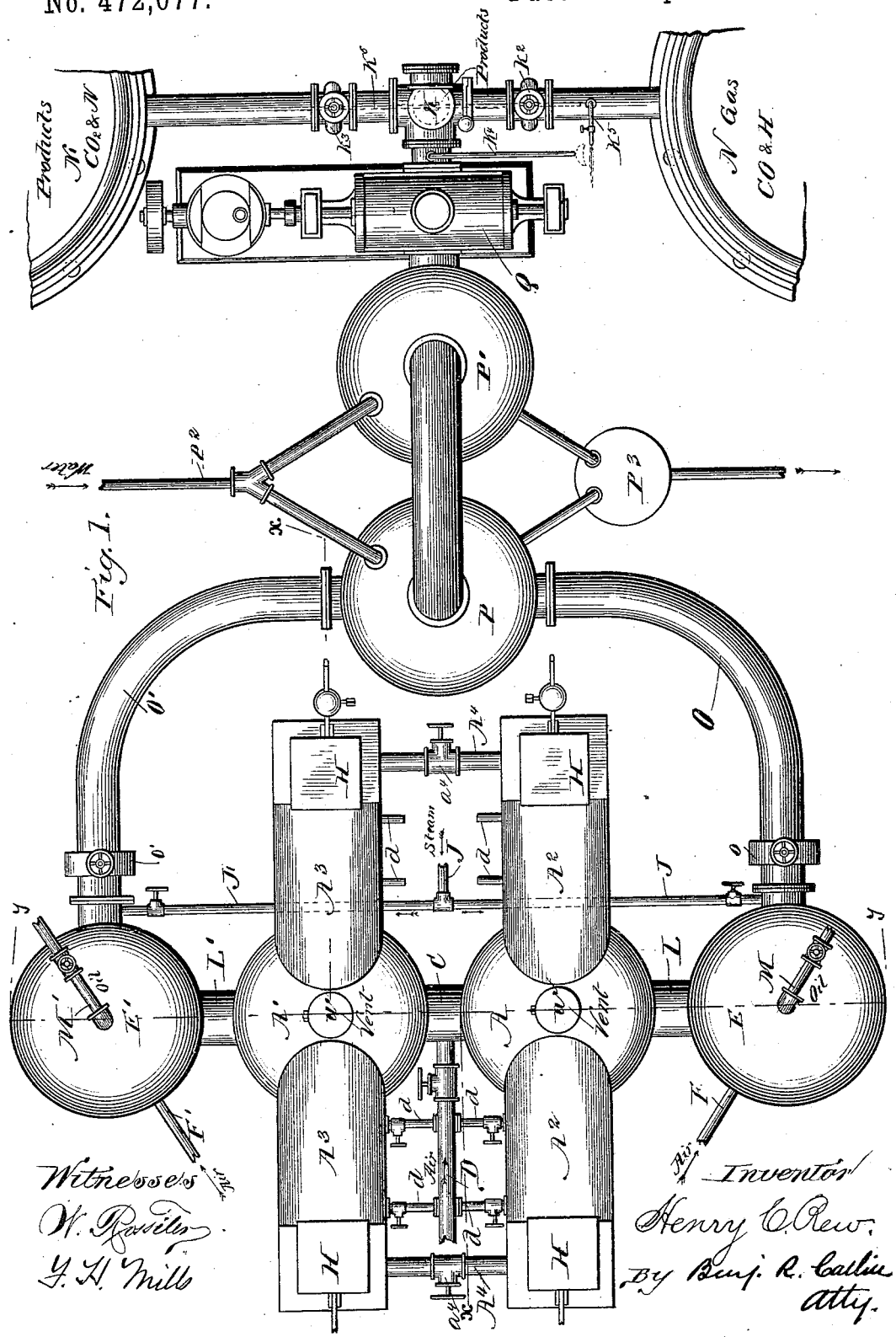

(No Model.) 6 Sheets—Sheet 1.

H. C. REW.
APPARATUS FOR THE MANUFACTURE OF GAS.

No. 472,077. Patented Apr. 5, 1892.

Witnesses
W. Rossiter
Y. H. Mills

Inventor
Henry C. Rew,
By Benj. R. Catlin
Atty.

(No Model.) 6 Sheets—Sheet 2.
H. C. REW.
APPARATUS FOR THE MANUFACTURE OF GAS.

No. 472,077. Patented Apr. 5, 1892.

(No Model.) 6 Sheets—Sheet 3.
H. C. REW.
APPARATUS FOR THE MANUFACTURE OF GAS.
No. 472,077. Patented Apr. 5, 1892.

(No Model.) 6 Sheets—Sheet 4.
H. C. REW.
APPARATUS FOR THE MANUFACTURE OF GAS.

No. 472,077. Patented Apr. 5, 1892.

WITNESSES
Arch. M. Catlin.
Alex. Scott

INVENTOR
Henry C. Rew
by
Benj. R. Catlin
Atty.

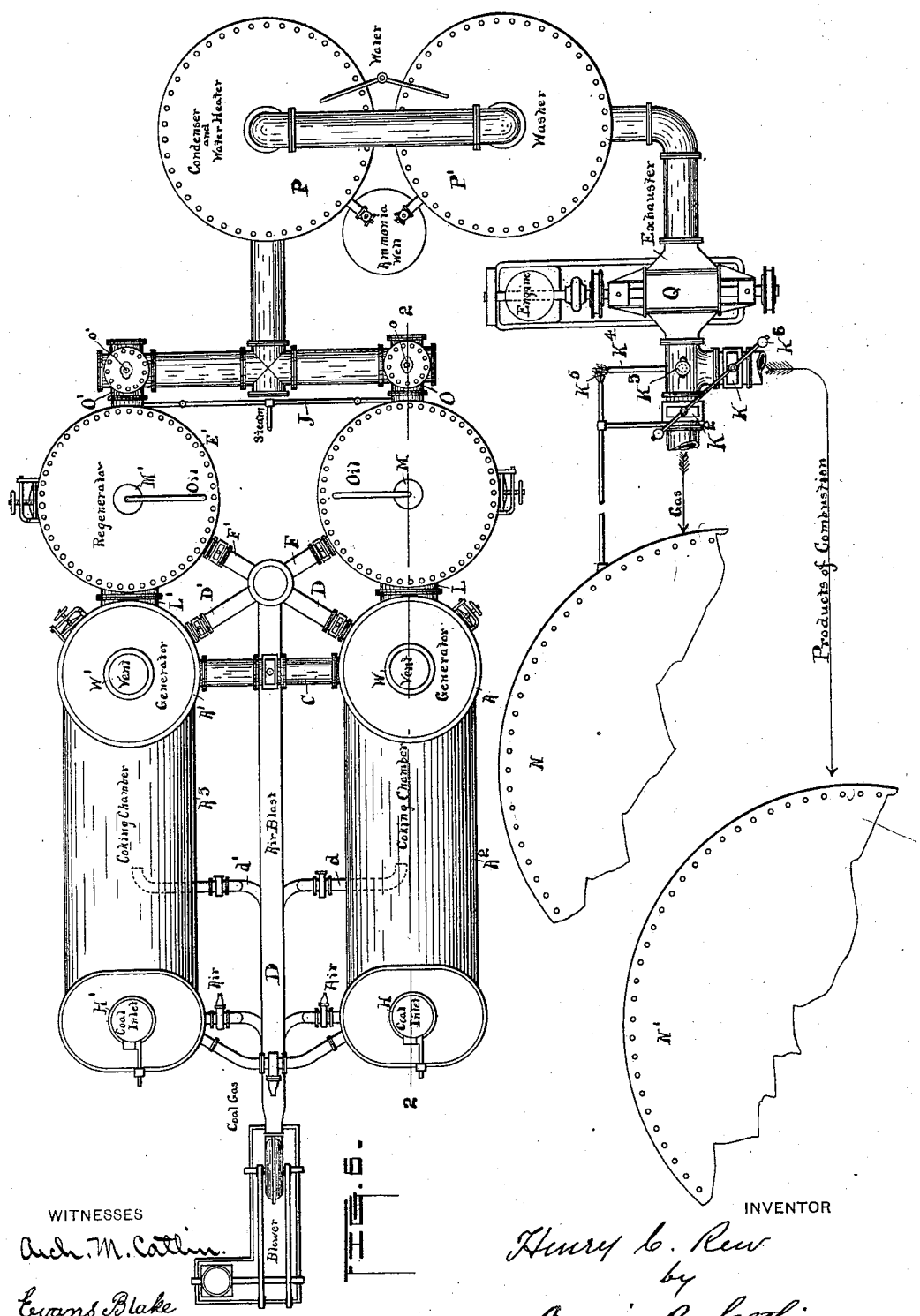

(No Model.) 6 Sheets—Sheet 6.
H. C. REW.
APPARATUS FOR THE MANUFACTURE OF GAS.
No. 472,077. Patented Apr. 5, 1892.
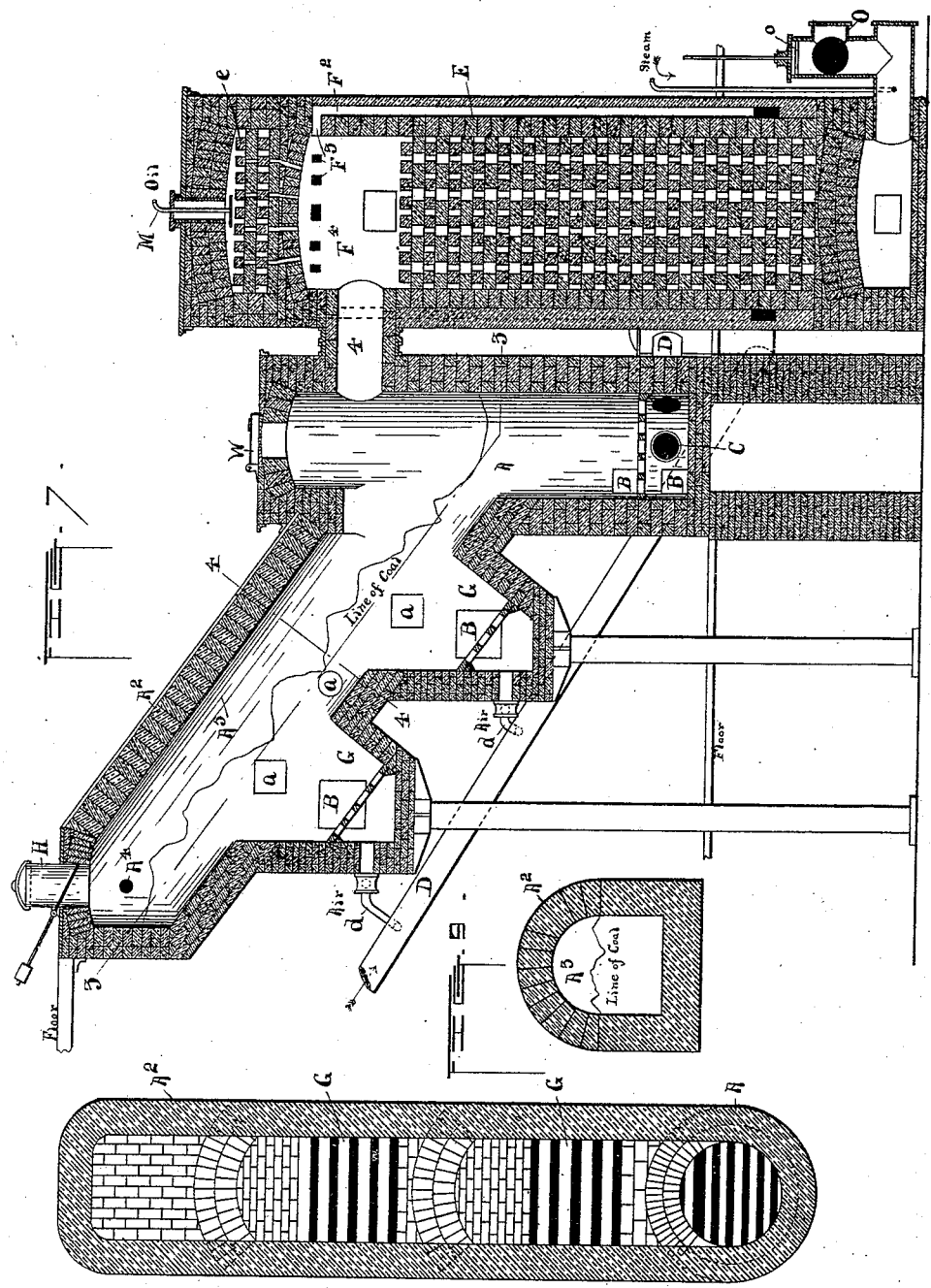
WITNESSES
INVENTOR

UNITED STATES PATENT OFFICE.

HENRY CUNNINGHAM REW, OF CHICAGO, ILLINOIS.

APPARATUS FOR THE MANUFACTURE OF GAS.

SPECIFICATION forming part of Letters Patent No. 472,077, dated April 5, 1892.

Application filed January 21, 1891. Serial No. 378,521. (No model.)

*To all whom it may concern:*

Be it known that I, HENRY CUNNINGHAM REW, of Chicago, in the county of Cook and State of Illinois, have invented certain new and useful Improvements in Apparatus for the Manufacture of Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of gas, and is an improvement on processes and apparatus for which Patents Nos. 290,926, 290,930, 339,471, 339,472, 341,506, 389,103, 389,104, 389,105, and 389,106 have been previously granted to me.

In the construction and operation of gas-generators designed to use bituminous coal, similar to those shown in the drawings to Patent No. 389,106, I have discovered, first, that in the use of slow-coking coals the heat was not radiated and conducted from the combustion-chambers and regenerators into the coking-chambers with sufficient rapidity to completely coke the coal before it descended into the combustion and water gas generating chambers; also, second, that heat was unnecessarily radiated from the pipes $A^5 A^6$, which conducted gas from the tops of the coking-chambers to the regenerators, and that the use of the valves which controlled said pipes was objectionable; also, third, that it was desirable to vaporize the oil by the use of heat that would otherwise be radiated from the tops of the regenerators before it entered the fixing-chamber and was mingled with the current of water-gas.

The object of this invention is therefore, first, to provide means for the complete coking of any kind of bituminous coal before it enters the combustion and steam-decomposing chambers; second, to dispense with valved pipes connecting the tops of the coking-chambers and regenerators, and, third, to provide for vaporizing the oil by heat that otherwise would be radiated and lost.

Having stated the nature and object of my invention, I will now describe it more particularly by reference to the accompanying drawings, in which—

Figure 2:
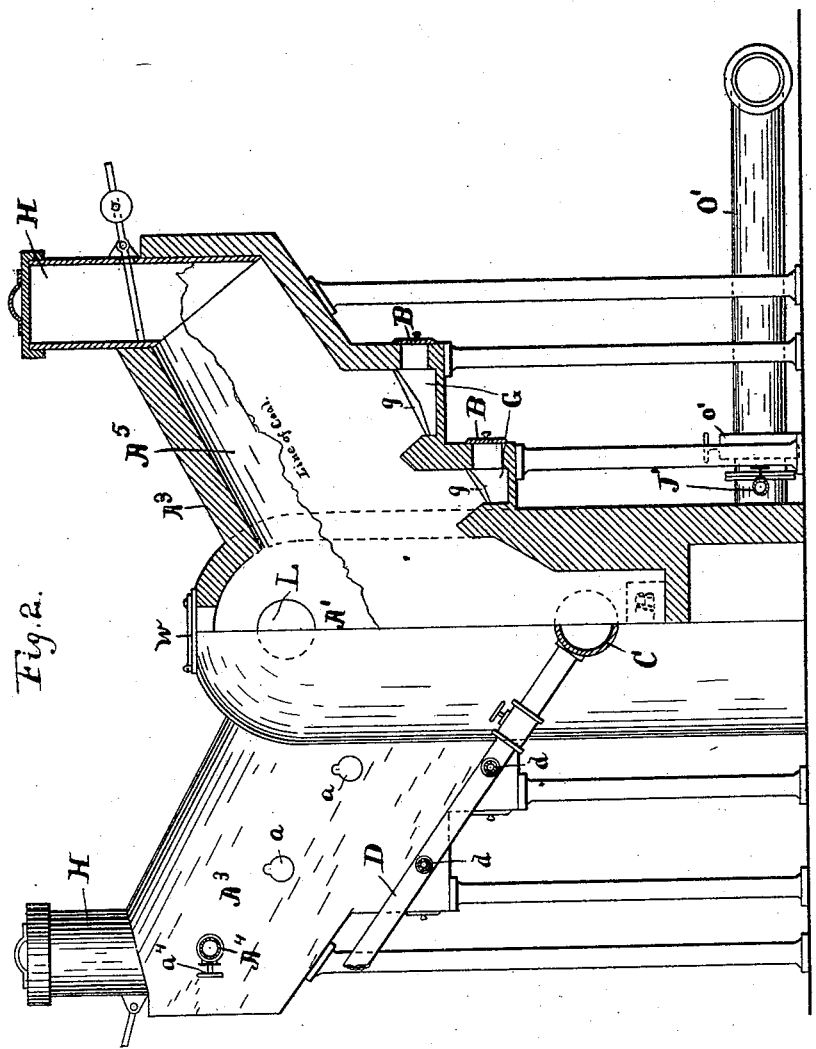
Figure 3:
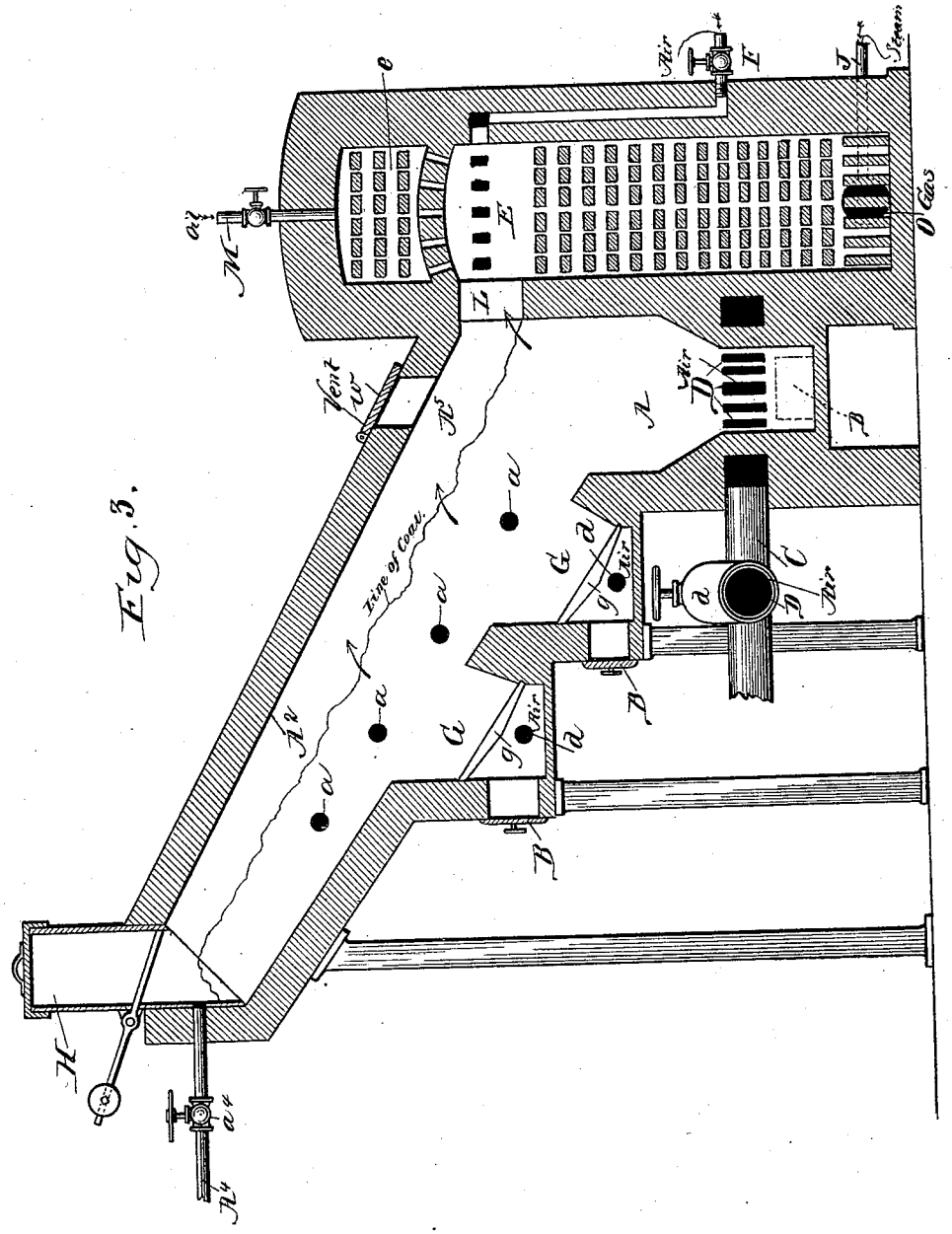
Figure 4:
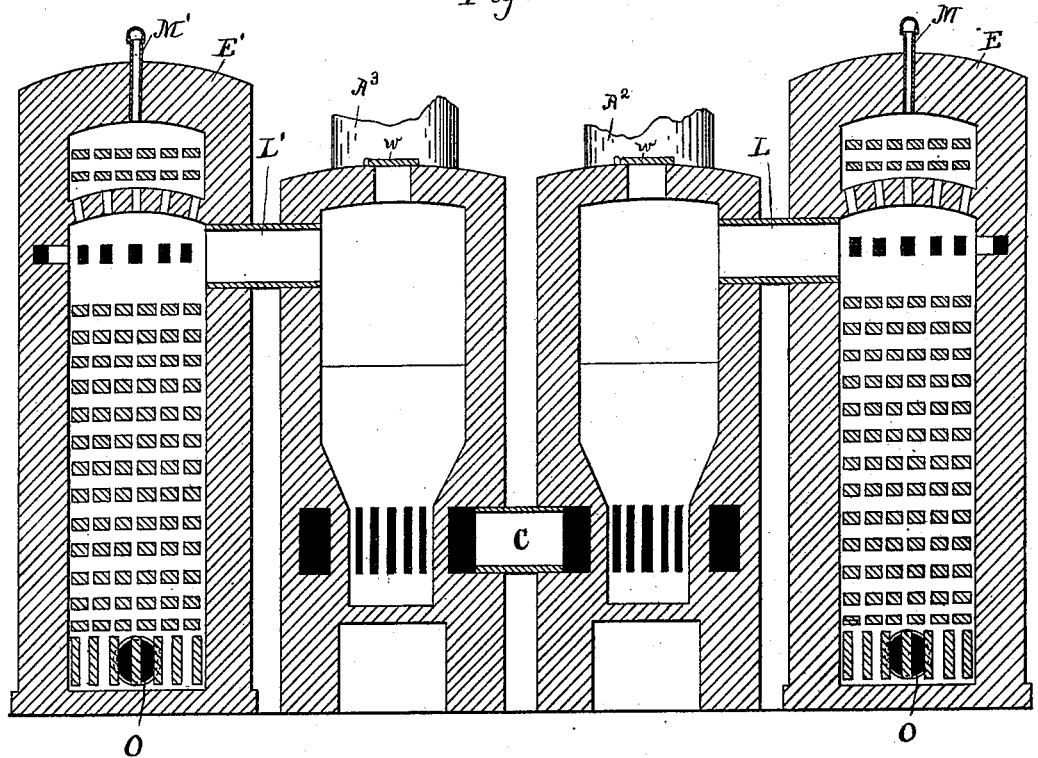
Figure 5:
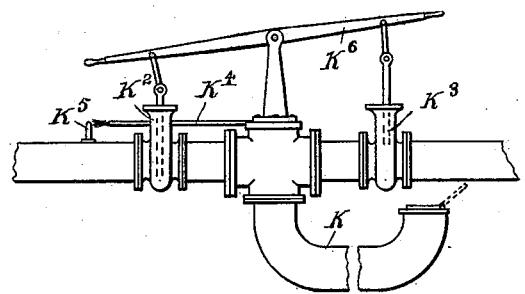

Figure 1 is a plan of my improved apparatus. Fig. 2 is a section on line $x\ x$ of Fig. 1. Fig. 3 indicates a modification, and Fig. 4 is a section, on line $y\ y$ of Fig. 1; and Fig. 5 is a sectional detail. Fig. 6 is a plan showing a variation in the arrangement of the regenerators and air-pipes. Fig. 7 is a section on line 2 2 of Fig. 6. Fig. 8 is a section on line 3 3 of Fig. 7, and Fig. 9 is a section on line 4 4 of Fig. 7.

Similar letters designate like parts in all of the drawings shown, and also in drawings accompanying the Patent No. 389,106.

$A\ A'$ designate combustion-chambers connected at the base by the flue C, in which coke is raised to incandescence by admitting air through pipe D and used for decomposing steam. They are fitted at their tops with man-holes and vents W W, having gas-tight covers. At their base they are supplied with doors B for removing ashes.

$A^2\ A^3$ designate coking-chambers located above the combustion-chambers and directly connected thereto, in order that the coke may fall by gravity from the coking-chambers into the combustion-chambers. The open space $A^5$ above the coal serves the purpose of the valved pipe $A^5$. (Shown in Patent No. 389,106.)

Separate combustion-chambers G G are provided in the base of the coking-chambers, having separate air-supply pipes $d\ d$ and separate ash-outlets B B.

Openings $a\ a\ a$ with suitable covers are provided in the sides of the coking-chambers, through which bars may be inserted for the purpose of breaking up the mass of coking coal and to move it down the incline into the combustion-chambers. The coking-chambers are preferably fitted at the top with any suitable tight feeding apparatus H H, so that coal may be supplied without the escape of heat and gas and without fully opening the chambers.

The regenerators $E E'$ are directly connected with the combustion-chambers by open flues $L\ L'$. They are filled with loosely-piled refractory material, and serve the purpose of storing and retaining the heat of the burning gases made while heating up and which is subsequently used for the superheating of the steam and the fixing of the gases generated. Gas-burning chambers in the regenerators having pipes F F' and flues and ports for supplying heated air to burn the primary products of combustion are connected with flues L L'. Above these chambers perforated arches and a separate chamber $e$ filled with loosely-piled refractory material are constructed which are utilized for vaporizing the oils supplied through pipes M M', which vapors are used in enriching the gas. At the base of the regenerators outlet-pipes O O', controlled by suitable valves $o$ $o'$ for the escape of products of combustion and gas are provided, connecting directly with condenser and water-heater P, and washer P', exhauster Q, and holder N for the gas, and holder N' for the final burned products of combustion. A valved outlet for the final burned products of combustion is also provided at K, through which they may be discharged into the open air, if desired. The outlet pipes or mains from the exhauster are controlled by suitable valves. These are connected by a lever or equivalent mechanism $K^6$, so that when one outlet-valve is opened the other is simultaneously closed, thus always providing an outlet for the escape of the final burned products of combustion and gas from the exhauster. A small pipe $K^4$, connected with the main from the exhauster, discharges a continuous stream of gas, which is alternately non-combustible while heating up and combustible while making gas. To test the character of the gas and to determine when to change the outlet-valves, a burner $K^5$ supplied with gas from the gas-holder furnishes a continuous test-flame.

The operation of the apparatus is preferably as follows: The fuel-chambers A A' $A^2$ $A^3$ G G are first filled with coke or hard coal through the tight feeding apparatus H H, and the openings at the top are then tightly closed. The fuel is ignited in the base of chambers A A' and in the receptacles G G for incandescent fuel in the coking-chambers. Air is supplied, preferably, from a fan-blower through pipes and air-ports D $d$ $d$ to raise the fuel to incandescence. At the same time the exhauster Q is put in operation. Valves $o$ $o'$ in outlet-pipes O O' and, say, the outlet K being open, the primary products of combustion pass through flues L L' into the regenerators E E'. Heated air to burn the gases is supplied through pipes F F', and the final burned products of combustion pass down through the regenerators E E', through outlet-pipes O O', condenser P, washer P', and exhauster Q, and are discharged into the open air through outlet K. This operation raises to incandescence the fuel in the steam-decomposing chambers A A' and in the combustion-chambers G G, located in the bases of the coking-chambers. The heat generated by burning the primary products of combustion is stored in the regenerators. When the apparatus is properly heated, as seen through properly provided sight-holes, the air-supply pipes are closed and steam is simultaneously admitted to the base of one of the regenerators, say, by opening the valve in pipe J, which is connected with outlet-pipe O. The valve $o$ in outlet-pipe O is then closed, which directs the steam upward through regenerator E and through the flue L highly superheated, into and down through the incandescent fuel in chamber A, in which it is partially decomposed. The resulting water-gas and undecomposed steam then pass through the flue C into and up through the incandescent fuel in chamber A', and the resulting water-gas (the steam being thus completely decomposed) passes into the heated regenerator E'. At the same time the valve in pipe $A^4$ connecting the tops of the coking-chambers $A^2$ $A^3$ is wholly or partially opened to permit the passage of the coal-gas generated in the coking-chamber $A^2$ through said pipe into chamber $A^3$ and thence through space $A^5$ into the regenerator E' without passing through the incandescent fuel. A mixture of water-gas and volatile hydrocarbons distilled from soft coal are thus mingled and passed into the regenerator E', which are converted into a fixed illuminating-gas, consisting of carbonic oxide and light carbureted hydrogen by passing down through the heated refractory material. The gas is drawn from the base of the chamber E' through pipe O', condenser P, washer P', and exhauster Q, and when it passes the exhauster the gas issuing from pipe $K^4$ is ignited by the burning gas from pipe $K^5$. The valve K controlling the outlet-pipe for the final burned products is then closed and the valve $K^2$ to the gas-holder N is simultaneously opened, say, by operating the lever $K^6$, connected with both valves, thus directing the combustible gas into its proper holder. When the heat in the apparatus has been reduced by the superheating and decomposition of the steam and by the fixing of the gases, the steam is shut off and the air is again admitted to the combustion and coking chambers for heating up and the valve in outlet-pipe O is opened. When the non-combustible gases generated while heating up pass the exhauster, the gas burning at the outlet test-pipe $K^4$ is immediately extinguished and the valves K $K^2$ are again changed, so as to close the valve to the gas-holder and direct the final burned products into the open air, as in the beginning. It is thus seen that the operations of heating up and of making gas are alternate, the exhauster being kept steadily in operation. A holder N' is shown, into which the final burned products of combustion may be directed, if desired. As these gases will instantly extinguish fires, and also are composed of the same elements as the finest fertilizers—viz., carbonic acid, nitrogen, and sulphurous acid—means may be found to convert them to valuable uses. In case it is desired to increase the candle-power of the combustible gas, oil is admitted to the upper chamber in the regenerator E' through pipe M' while making gas, and while it is flowing down through the loose brick-work and heated arch through the perforations it is vaporized and is then mingled with the volume of water-gas and coal-gas generated in the combustion and coking chambers and all are combined into a fixed homogeneous gas by passing down through the heated brick-work. As the steam-inlets and gas-outlets to the regenerators E E' are similar, the operation of gas-making can be reversed at will, according to the condition of the fuel and regenerative chambers. For instance, after heating up the apparatus steam may be admitted to the base of regenerator E' and the resulting gases generated in the combustion and coking chambers may be enriched and fixed by passing through the regenerator E.

In water-gas apparatus as at present operated the final burned products of combustion are either forced out into the open air by the pressure of the air-blasts or are exhausted by chimneys, as shown in Patent No. 389,106. By this method all the ammonia contained in those gases and the gases themselves are lost. By my improved method of heating up the apparatus the ammonia contained in all of the gases generated is washed from the gas and provision is made for storing both combustible and non-combustible gases, a result not before attained in the art.

I am aware that gas-generating apparatus for bituminous coal have been heretofore proposed, having a lower air-blast for raising the coke to incandescence and an upper air-blast supply-pipe to admit air above the coke for the purpose of producing a low or "smothered combustion" in the overlying coal, thus attempting to cause it to throw off its volatile gases, as shown in Patent No. 361,191, granted to T. G. Springer; but such apparatus and methods are not of my invention and are defective in that the upper air-blast is principally absorbed in burning the primary products of combustion produced by the lower air-blast, and therefore does not raise the coal to the temperature that I have found necessary to thoroughly coke it.

By supplying air at the base of the fuel in the supplementary lower extension of the coking-chamber of my apparatus (shown in Fig. 3) no explosions are caused. Moreover, all the ashes and clinker produced in apparatus such as described in Patent No. 361,191, above referred to, by the upper air-blast fall into and clog the lower combustion-chamber and interfere seriously with the raising of the fuel to an incandescence in the lower combustion-chamber and with the decomposition of the steam. These evils I avoid entirely by inclining the coking-chamber and placing the upper air-supplies therein entirely out of range of the primary products of combustion generated by the lower air-supply. My invention in this direction is characterized by means for distinct and independently-controlled combustion in the coking-chambers in connection with the inclination and arrangement of the coking and main combustion chambers, whereby vapors and gases are conducted above the fuel in both chambers out of a common exit without the liability of gases from either chamber passing through the fuel in the other; also, the ashes and clinker produced by the upper air-supply pipes do not fall into the lower combustion and steam-decomposing chambers, but are removed by separate outlets, as indicated in Fig. 1.

The combustion-chambers A A' are supplied with additional hot fuel as fast as it is consumed by the coal or coke in the upper chambers $A^2$ $A^3$, descending by gravity. Clinker bars or rods can be introduced through openings $a$ $a$ to break up adhering fuel and hasten its descent, if desired. As the coke or hard fuel first supplied sinks down in the upper chambers $A^2$ $A^3$ fresh bituminous coal is supplied through the openings at the tops of the chambers after each run of gas, or as required. Preferably these openings or fuel-chutes are provided each with a valve at the top and also at the bottom in a well-known form, as indicated in Fig. 1, in order to prevent the escape of gas while charging coal into the furnace. As the coal enters the chambers $A^2$ $A^3$ it is exposed to heat radiated directly and continuously from the combustion-chambers and regenerators, and its volatile hydrocarbons are thrown off during its descent through the upper chambers $A^2$ $A^3$.

While heating up the apparatus in the manner above described the rich gases evolved in the coking-chambers may pass into the regenerators, whereby they will mingle with the products of combustion passing through flues L L' and with the air entering the upper parts of the regenerators through ports connected with the vertical flues F F' and be burned, and thus aid in quickly heating the regenerative chambers previous to making gas.

By my improved method coal is quickly coked without retorts by fires and heat directly applied to it, the primary products of combustion produced while heating up are burned while hot, and the heat so generated is stored in regenerators and utilized for superheating steam and for fixing the water-gas, coal-gas, and oil-vapors into a homogeneous gas, the oil being vaporized before entering the current of water-gas and coal-gas. A pressure of air and steam is applied at one end of the apparatus and an exhaust at the other, thus removing the products as fast as they are generated, causing the complete combustion of the carbonic oxide within the apparatus while heating up and the minimum production of deleterious carbonic acid while making gas.

The ammonia is washed from all the gases generated both when heating up and when making gas, and means are provided for storing all of the gases produced that they may be converted to valuable uses. All of these advantages are secured in one operation and in a cheaply-constructed apparatus that can be rapidly operated with a small amount of labor, thus converting bituminous and other coals (including the coke and tar) completely into an entirely combustible fixed illuminating-gas consisting of carbonic oxide and carbureted hydrogen and leaving no residuals but the ash.

It will be understood that I do not limit myself to the precise arrangements and details of my improved apparatus, as hereinbefore described with reference to the accompanying drawings, as the construction may be variously modified without departing from the nature of my invention—as, for instance, the hot products of combustion and gases may be passed into the base of regenerative chambers and out at their tops or sides, the apparatus may be constructed all in one or two structures with suitable dividing gas-tight walls, and the construction of the combined combustion and coking chambers may be modified in various ways that do not interfere with the operation of the apparatus, substantially as described.

Fig. 3 indicates an apparatus with the fuel-chambers and regenerators closely connected in practically one structure. Preferably the apparatus is constructed, as indicated in Fig. 1, with each chamber in cylindrical form and having its own separate iron shell riveted and calked gas and steam tight.

Having thus described the improvements on my previous inventions, what I claim, and desire to secure by Letters Patent, is as follows, viz:

1. In an apparatus for the manufacture of gas, the combination of a main combustion-chamber provided with air-supplying ports and an ash-discharging door, an inclined coking-chamber at or near its upper part, said chamber having located in its inclined bottom wall a distinct combustion-chamber provided with an air-inlet and with an outlet adapted for the removal of ashes, the space immediately beneath the upper wall above the normal position of the charge of coal of said coking-chamber being normally in free communication with the upper part of the first-named combustion-chamber, whereby coal can be coked, its gases passed over the fuel in the main combustion-chamber, and its ashes separately removed without passing through said main combustion-chamber, substantially as set forth.

2. In an apparatus for the manufacture of gas, the combination of the main combustion-chamber, the inclined coking-chamber communicating therewith, said chambers each having distinct air-supplying ports and separate openings or doors for the removal of ashes, and a regenerator-chamber provided with a conduit, whereby it communicates with said main combustion-chamber, the upper parts of the several chambers being normally in free communication, substantially as set forth.

3. In an apparatus for the manufacture of gas, the combination of a main combustion-chamber, provided with air-supplying ports and an ash-discharging door, an inclined coking-chamber at or near its upper part in open communication therewith, said chamber having in its inclined bottom wall a distinct combustion-chamber provided with an air-inlet, the upper part of said coking-chamber being normally in free communication with the upper part of the first-named combustion-chamber, whereby coal can be raised to incandescence and coked and its gases passed over the fuel in the coking and main combustion chambers, substantially as set forth.

4. The combination of a gas-generating chamber provided with means for supplying air, steam, and coke thereto, a regenerator in communication therewith having a perforated arch near the level of the top of the chamber first named, the air-supply ports being below said arch and a chamber above said arch filled with loose material, like open brickwork, and an oil-pipe to supply oil to said chamber, whereby heat radiated from the arch will constantly heat the loose material and whereby the heat from the latter will vaporize the oil when admitted thereto, substantially as shown and described.

5. The combination of a gas-generator provided with means for supplying air, steam, and coke thereto, of two gas-holders communicating therewith through a pipe having two branches, one for each holder, each branch pipe having a valve, an exhauster, a washer, said exhauster communicating with said pipe, a pipe whereby said exhauster communicates with the washer, a pipe whereby the washer communicates with the generator, a discharge-pipe communicating with each of said branch pipes and opening into the external air, and a valve for said discharge-pipe, all as set forth, whereby gases can be washed and sent to either holder or discharged elsewhere, substantially as specified.

6. The combination of a gas-generating apparatus, a gas-washer, an exhauster, suitable connecting-pipes by which the said apparatus and devices communicate, two gas-holders, a pipe having two branches through which the exhauster can communicate with the holders, valves, one in each of said branches, a lever or equivalent device connecting the valves, whereby either may be closed simultaneously with the opening of the other, and a valved pipe connected to the branches between said valves and adapted to discharge into the open air, substantially as shown and described.

7. In combination, a gas-generating apparatus, a gas-holder connected by a communicating pipe with said apparatus, said pipe having a valve and having a branch provided with a valve, said branch being adapted to discharge outside said holder, a gas-burner on the pipe leading to the holder and between it and the valve in said branch pipe, and a gas-burner on the pipe leading from the generator, situated between said generator and the branch pipe, said latter burner extending to near the burner first named, whereby the character of the gas being produced can be ascertained and the gas either conveyed to the holder or discharged elsewhere, substantially as shown and described.

In testimony that I claim the foregoing as my own I hereto affix my signature in presence of two witnesses.

HENRY CUNNINGHAM REW.

Witnesses:
HENRY E. LOWE.
H. G. BOTTUM.